Patented Aug. 7, 1923.

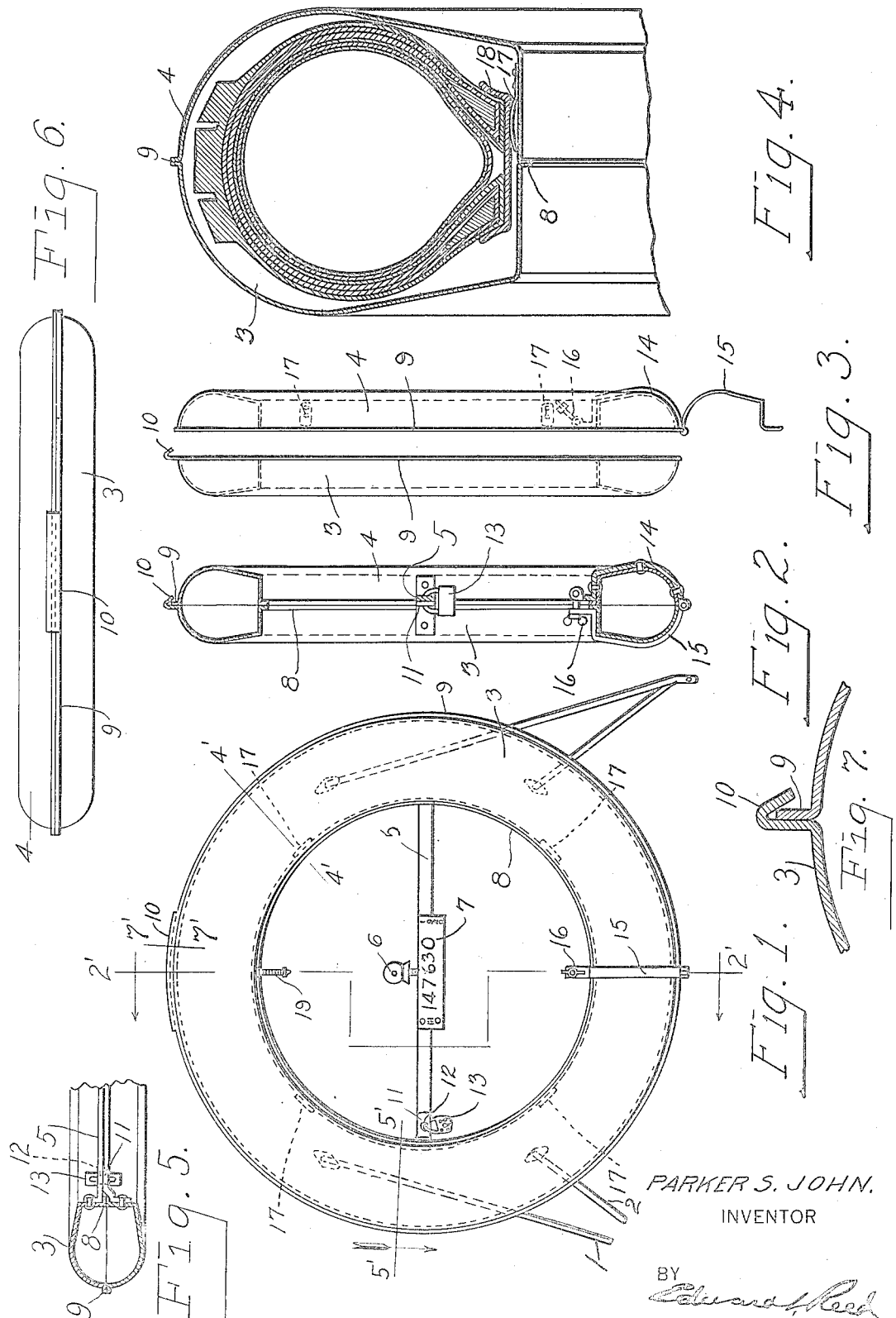

1,463,957

UNITED STATES PATENT OFFICE.

PARKER S. JOHN, OF DAYTON, OHIO.

TIRE CARRIER.

Application filed April 21, 1921. Serial No. 463,309.

*To all whom it may concern:*

Be it known that I, PARKER S. JOHN, a citizen of the United States, residing at Dayton, in the county of Montgomery and State of Ohio, have invented certain new and useful Improvements in Tire Carriers, of which the following is a specification, reference being had therein to the accompanying drawing.

This invention relates to improvements in all-metal tire carriers, having particular reference to the type of metal tire carriers which completely enclose the tire.

The improvements of the present invention consist in providing two opposite half-sections of a metal casing adapted to form the enclosure for the tire, one of the sections being secured in fixed relation relative to the body or chassis of the automobile, and the other section being detachably secured to the permanently mounted section to effect the complete enclosure and to provide for conveniently supporting a tire therein.

In the present invention a construction is employed which avoids telescopic overlapping of either the inner or outer edges of the opposite half-sections, thus overcoming a well known objection to metal tire carriers of this type, i. e.,—the difficulty of assembling the casing when close fitting joints are maintained.

Further improvements of my invention relate to features which tend to simplify manufacturing operations and thus to cheapen production of the tire carrier, and which also tend to make the improved carrier more satisfactory to the user, as will be readily apparent from the accompanying drawings and the detailed specification.

In the drawings:

Fig. 1 is a front elevation of the improved tire carrier;

Fig. 2 is a transverse sectional view of the same taken on the line 2'—2' of Fig. 1;

Fig. 3 is a side elevation of the tire casing with the half-sections separated, and Fig. 4 is a detail cross-sectional view on the line 4'—4' of Fig. 1 showing the position of a tire supported in the casing.

Fig. 5 is a transverse sectional view taken on the line 5'—5' of Fig. 1; Fig. 6 is a top plan view of the carrier; and Fig. 7 is a sectional view of a portion of the carrier, taken on the line 7'—7' of Fig. 1.

Any suitable means may be employed for mounting the tire carrier relative to the automobile, as the brackets 1 and 2, no novelty being claimed as to the mounting means.

The tire casing consists of the two opposite half-sections 3 and 4, part 4 being the inner, permanently mounted section, and part 3 the outer detachable section. A brace 5, as here shown, is disposed transversely across section 4 to align and stiffen the casing, the brace serving also as a suitable means for mounting a tail light 6 and license tag 7.

As distinguished from a telescopic joint, the present construction provides for a butt-joint at both the inner and outer edges of sections 3 and 4 and, as here shown, to form a neat, close fitting joint the edges are provided with outwardly extended circumferential flanges 8 and 9, the opposite faces of the flanges abutting one against the other when the casing is assembled.

While the flanges 8 and 9 are here shown as outwardly extended circumferential flanges, it will be apparent from the construction shown that inwardly extended flanges would serve substantially the same purpose, and that the butt-joint between the sections could be formed without the flanged edges, or by employing flanges extending along only a portion of the edges.

Flange 9 of outer section 3 is provided at its upper portion with a downwardly curved extension 10 which projects over flange 9 of section 4 and serves to hold the upper portion of the casing in assembled relation. Section 3 is further provided with an inwardly extended strap 11 having an aperture 12 adapted to be aligned with a corresponding aperture in brace 5 whereby a padlock 13, or other suitable means may be applied to secure the outer section of the casing to the brace.

A clamp comprising opposite hinged members 14—15, and adjusting screw 16, as here shown, is applied to the lower portion of the casing to hold the opposite sections firmly together, thus to prevent chattering or relative movement of the parts, clamp member 14 being preferably secured to inner section 4 of the casing.

Springs 17 are provided adjacent the inner edge of section 4 for supporting the tire in the casing, the springs being adapted to press against the steel rim 18 of the tire and thus to support the tire and prevent relative movement of the same in the casing, a suitable notch or clearance space being provided in the upper portion of the opposite sections of the casing for the tire valve stem 19.

From the foregoing detailed description the construction of my improved tire carrier will be readily understood and the advantages of the improvements afforded by the invention will be readily apparent to those experienced in this art, the improvements having particular reference, as stated, to the non-telescopic assembly of the casing and simplified construction which make possible cheaper production and more convenient usage.

Having described my invention, I claim:

1. A tire carrier including a permanently mounted annular casing section open at the front and adapted to support a tire therein, a corresponding casing section, detachable as a whole therefrom open oppositely to the permanently mounted section and adapted to form a butt-joint therewith when said casing is assembled, said sections having interlocking parts to aline the abutting edges of the two sections, and other means to hold said abutting edges in engagement one with the other.

2. A tire carrier including a permanently mounted annular casing section open at the front and adapted to support a tire therein, a corresponding detachable casing section open oppositely to the permanently mounted section and adapted to form a butt-joint therewith when said casing is assembled, the permanently mounted section having an outwardly extending flange at its upper edge and the detachable section having an outwardly extending flange provided with a part arranged to overlap the flange on the permanently mounted section to support the detachable section with its edges in alinement with the corresponding edges of the permanently mounted section, and a fastening device to engage the lower portions of said sections to hold the edges of said sections in engagement one with the other.

3. A tire carrier including a permanently mounted annular casing section open at the front and adapted to support a tire therein, a corresponding detachable casing section open oppositely to the permanently mounted section and adapted to form a butt-joint therewith when said casing is assembled, the permanently mounted section having an outwardly extending flange at its upper edge and the detachable section having an outwardly extending flange provided with a part arranged to overlap the flange on the permanently mounted section to support the detachable section with its edges in alinement with the corresponding edges of the permanently mounted section, and a clamping device engaging the lower portions of said sections to clamp the edges thereof in engagement one with the other.

4. A tire carrier comprising a permanently mounted annular casing section open at the front, a detachable casing section open oppositely to the permanently mounted section, both sections having outwardly extending flanges at their outer edges and inwardly extending flanges at their inner edges, said detachable section having at its upper edge a part to engage over the flange of the permanently mounted section to support said detachable section with the flanges thereof in abutting alinement with the flanges of the permanently mounted section, and means clamping said sections together.

5. A tire carrier comprising a permanently mounted annular casing section open at the front, a detachable casing section open oppositely to the permanently mounted section, both sections having outwardly extending flanges at their outer edges and inwardly extending flanges at their inner edges, the flange of said detachable section having an inclined extension extending downwardly from the upper edge thereof and arranged to overlap the flange of the permanently mounted section to support said detachable section with the flanges thereof in abutting alinement with the flanges of the permanently mounted section, and a clamping device engaging the lower portions of said sections to secure said flanges in abutting engagement.

6. A tire carrier comprising a permanently mounted annular casing section open at the front, a detachable casing section open oppositely to the permanently mounted section, both sections having outwardly extending flanges at their outer edges and inwardly extending flanges at their inner edges, the flange of said detachable section having an inclined extension extending downwardly from the upper edge thereof and arranged to overlap the flange of the permanently mounted section to support said detachable section with the flanges thereof in abutting alinement with the flanges of the permanently mounted section, a clamping device comprising a part rigidly secured to the permanently mounted section, and a hinged portion adapted to extend about the adjacent portion of the detachable section, and means acting on said hinged portion of said clamping device to secure said sections with their flanges in abutting engagement.

7. A tire carrier including a permanently mounted annular casing section open at the front and adapted to support a tire therein, a corresponding detachable casing section open oppositely to the permanently mounted section and adapted to form a butt-joint therewith when said casing is assembled, said permanently mounted section having an outwardly extending flange at its upper edge, and said detachable section having a corresponding flange provided with a downwardly and rearwardly extending portion to overlap the flange of said permanently mounted section to support said detachable section with its edge in abutting alinement with the edge of the permanently mounted section, and means for clamping said sections one to the other.

8. A tire carrier including a permanently mounted annular casing section open at the front and adapted to support a tire therein, a corresponding detachable casing section open oppositely to the permanently mounted section and adapted to form a joint therewith when said casing is assembled, and a plurality of resilient elements mounted on the inner wall of the permanently mounted section to support the rim of a tire out of contact with said wall and prevent the same from rattling, said resilient elements constituting the sole support for the rim of the tire.

9. A tire carrier including a permanently mounted annular casing section open at the front and adapted to support a tire therein, a corresponding detachable casing section open oppositely to the permanently mounted section and adapted to form a butt-joint therewith when said casing is assembled, a brace bar extending diametrically of said permanently mounted section and rigidly secured to the inner edges thereof, a part secured to the inner wall of said detachable section and overlapping said brace bar, and means for securing said part to said brace bar.

In testimony whereof, I affix my signature hereto.

PARKER S. JOHN.